United States Patent
Han et al.

(10) Patent No.: US 10,795,320 B2
(45) Date of Patent: Oct. 6, 2020

(54) WEARABLE ELECTRONIC DEVICE INCLUDING METAL STRAP

(71) Applicant: SAMSUNG ELECTRONICS CO., LTD., Suwon-si, Gyeonggi-do (KR)

(72) Inventors: Yonghwa Han, Suwon-si (KR); Heecheul Moon, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/564,337

(22) Filed: Sep. 9, 2019

(65) Prior Publication Data

US 2020/0004208 A1 Jan. 2, 2020

Related U.S. Application Data

(63) Continuation of application No. 15/730,933, filed on Oct. 12, 2017, now Pat. No. 10,409,228.

(30) Foreign Application Priority Data

Oct. 18, 2016 (KR) .................. 10-2016-0134968

(51) Int. Cl.
| | |
|---|---|
| *H05K 5/00* | (2006.01) |
| *G04G 17/08* | (2006.01) |
| *A44C 5/00* | (2006.01) |
| *G06F 1/16* | (2006.01) |
| *G04G 17/02* | (2006.01) |

(Continued)

(52) U.S. Cl.
CPC ........... *G04G 17/08* (2013.01); *A44C 5/0061* (2013.01); *G04G 17/02* (2013.01); *G04G 21/04* (2013.01); *G04R 60/02* (2013.01); *G06F 1/163* (2013.01); *G06F 1/1633* (2013.01)

(58) Field of Classification Search
CPC ....................................................... H05K 5/00
See application file for complete search history.

(56) References Cited

U.S. PATENT DOCUMENTS

| | | |
|---|---|---|
| 5,742,256 A | 4/1998 | Wakabayashi |
| 6,874,931 B2 | 4/2005 | Noirjean et al. |
| 10,177,798 B2 | 1/2019 | Zhao et al. |

(Continued)

FOREIGN PATENT DOCUMENTS

| | | |
|---|---|---|
| CN | 102544726 A | 7/2012 |
| CN | 104934693 A | 9/2015 |

(Continued)

OTHER PUBLICATIONS

U.S. Appl. No. 15/730,933, filed Oct. 12, 2017; Han et al.

(Continued)

*Primary Examiner* — Jerry Wu
(74) *Attorney, Agent, or Firm* — Nixon & Vanderhye P.C.

(57) ABSTRACT

According to various example embodiments, a wearable electronic device is provided, the wearable electronic device including a metal housing used as an antenna radiator and electrically connected to a communication circuit, at least one metal strap coupled to at least one region of the metal housing, and a non-conductive member comprising a non-conductive material disposed between the metal strap and the metal housing, wherein the non-conductive member electrically insulates the metal strap and the metal housing.

1 Claim, 16 Drawing Sheets

(51) Int. Cl.
*G04G 21/04* (2013.01)
*G04R 60/02* (2013.01)

(56) References Cited

U.S. PATENT DOCUMENTS

| | | |
|---|---|---|
| 10,409,228 B2 | 9/2019 | Han et al. |
| 2012/0146858 A1 | 6/2012 | Tsai et al. |
| 2014/0268522 A1* | 9/2014 | Tanaka ................ A61B 5/0295 |
| | | 361/679.01 |
| 2015/0063075 A1 | 3/2015 | Baek et al. |
| 2015/0115870 A1* | 4/2015 | Vance .................... G04G 21/00 |
| | | 320/101 |
| 2015/0349410 A1 | 12/2015 | Russell et al. |
| 2015/0370224 A1 | 12/2015 | Emmert et al. |
| 2016/0255733 A1 | 9/2016 | Jung et al. |
| 2016/0261032 A1 | 9/2016 | Chang |

FOREIGN PATENT DOCUMENTS

| | | |
|---|---|---|
| CN | 105182731 A | 12/2015 |
| CN | 204989796 U | 1/2016 |
| CN | 205427450 U | 8/2016 |
| KR | 10-2015-0026387 | 3/2015 |
| TW | 200950210 A | 12/2009 |
| WO | WO-2015117647 A1 | 8/2015 |

OTHER PUBLICATIONS

Search Report dated Feb. 28, 2018 in counterpart European Patent Application No. EP17196792.0.
CN Office Action dated Aug. 5, 2020 for Chinese Application No. 201710958343.2.

* cited by examiner

WEARABLE ELECTRONIC DEVICE INCLUDING METAL STRAP

CROSS-REFERENCE TO RELATED APPLICATION

This application is a Continuation of U.S. application Ser. No. 15/730,933, filed Oct. 12, 2017 (now U.S. Pat. No. 10,409,228), which claims priority to KR 10-2016-0134968, filed Oct. 18, 2016, the entire contents of which are all hereby incorporated herein by reference.

BACKGROUND

1. Field of the Disclosure

The present disclosure relates generally to a wearable electronic device including a metal strap.

2. Description of Related Art

The development of electronic devices has recently applied to various fields closely related to everyday lives. In particular, among the electronic devices, a portable device has become the most essential necessity of everyday lives.

Since the electronic devices are launched in various sizes according to functions thereof and users' preferences, an outer appearance of the electronic devices has also become important in addition to compact sizes and functions of the devices. Even if the electronic devices have almost the same functions as devices of other vendors, an electronic device having a superior function and an elegant design is more preferred by a user.

In particular, a wearable electronic device has a size limited to be attachable to a user's body, and is improved to effectively perform various functions within the limited size.

SUMMARY

According to various example embodiments, a wearable electronic device may include a housing (e.g., a main body) and at least one strap (e.g., a connecting portion, a fastening portion) joined to at least one region of the housing. According to an example embodiment, the wearable electronic device may be configured, for example, in a wrist watch type, and may be attached to a user's wrist using at least one strap. According to an example embodiment, the strap may comprise various materials and be configured in various manners. According to an example embodiment, the strap may be configured such that a plurality of unit links are joined to each other in a movable manner. In this case, the strap may include a plurality of metallic or ceramic unit links. According to an example embodiment, the strap may be formed in an integral band type. In this case, the strap may include at least one rubber or urethane band.

According to various example embodiments, in the wearable electronic device, at least one portion of the main body may be comprise a metal material to reinforce rigidity and to provide an elegant outer look. In addition, in the wearable electronic device, at least one region of a metallic housing may be used as an antenna radiator through feeding to cope with a slimness trend.

According to various example embodiments, if the metallic housing used as the antenna radiator is coupled to the metallic strap, there may be a problem in that radiation efficiency of the antenna radiator rapidly deteriorates.

According to various example embodiments, a wearable electronic device including a metal strap having an improved metal strap assembly structure may be provided.

According to various example embodiments, a wearable electronic device including a metal strap capable of preventing and/or reducing deterioration in radiation efficiency of an antenna radiator due to the metal strap may be provided.

According to various example embodiments, a wearable electronic device may include a metal housing configured to be used as an antenna radiator and electrically connected to a communication circuit, at least one metal strap coupled to at least one region of the metal housing, and a non-conductive member comprising a non-conductive material disposed between the metal strap and the metal housing. The non-conductive member may electrically disconnect and/or insulate the metal strap and the metal housing.

According to various example embodiments, a wearable electronic device may include a metal housing configured to be used as an antenna radiator and electrically connected to a communication circuit, and including at least one strap joining portion, at least one metal strap including a conductive coupling member configured to be joined to the strap joining portion, a non-conductive member comprising a non-conductive material disposed on a contact surface of the conductive coupling member which is in contact with the strap joining portion, a conductive protrusion disposed to be exposed to one portion of the non-conductive member and extending from the conductive coupling member, a port insulated from the metal housing and being exposed to a position of the metal housing corresponding to the conductive protrusion, and an electrical connecting member configured to electrically connect the port and a ground of a substrate disposed inside the metal housing. The metal strap may be electrically insulated from the metal housing by the non-conductive member, and may be grounded to the substrate through the conductive protrusion and the port.

BRIEF DESCRIPTION OF THE DRAWINGS

The above and/or other aspects, features and attendant advantages of the present disclosure will be apparent and more readily appreciated from the following detailed description, taken in conjunction with the accompanying drawings, in which like reference numerals refer to like elements, and wherein:

FIG. 5B is coupled according to various example embodiments of the present disclosure;

DETAILED DESCRIPTION

Figure 1:
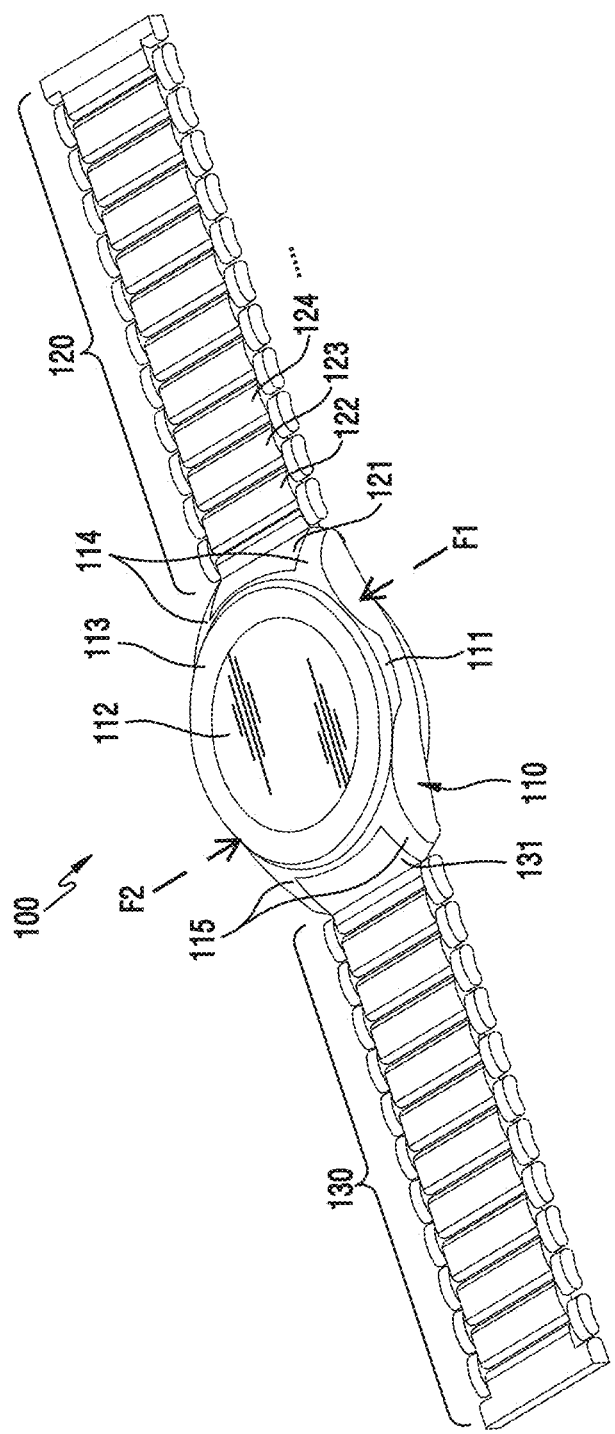
FIG. 1 is a perspective view illustrating an example wearable electronic device according to various example embodiments of the present disclosure.

Hereinafter, various example embodiments of the present disclosure are described with reference to the accompanying drawings. It should be understood, however, that it is not intended to limit the example embodiments of the present disclosure to any particular form disclosed, but, instead, it is intended to cover all modifications, equivalents, and alternatives falling within the spirit and scope of the example embodiments of the present disclosure. Like reference numerals denote like elements throughout the drawings.

An expression "have", "may have", "include" or "may include" or the like used in the present disclosure is intended to indicate a presence of a corresponding characteristic (e.g., a number, a function, an operation, or a constitutional element such as a component), and should be understood that there are additional possibilities of one or more other characteristics.

In the present disclosure, an expression "A or B", "A and/or B", or "one or more of A and/or B" or the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$", "$2^{nd}$", "first", and "second" may be used in the present disclosure to express various elements, it is not intended to limit the corresponding elements. For example, the above expressions may be used to distinguish one element from another element. For example, a $1^{st}$ user device and a $2^{nd}$ user device are both user devices, and indicate different user devices. For example, a $1^{st}$ element may be termed a $2^{nd}$ element, and similarly, the $2^{nd}$ element may be termed the $1^{st}$ element without departing from the scope of the present disclosure.

When a certain element (e.g., the $1^{st}$ element) is mentioned as being "operatively or communicatively coupled with/to" or "connected to" a different element (e.g., the $2^{nd}$ element), it is to be understood that the certain element is directly coupled with/to another element or can be coupled with/to the different element via another element (e.g., a $3^{rd}$ element). On the other hand, when the certain element (e.g., the $1^{st}$ element) is mentioned as being "directly coupled with/to" or "directly connected to" the different element (e.g., the $2^{nd}$ element), it may be understood that another element (e.g., the $3^{rd}$ element) is not present between the certain element and the different element.

An expression "configured to" used in the present document may be interchangeably used with, for example, "suitable for", "having the capacity to", "designed to", "adapted to", "made to", or "capable of" according to a situation. A term "configured to" may not refer only to "specially designed to" in a hardware manner. Instead, in a certain situation, an expressed "a device configured to" may imply that the device is "capable of" together with other devices or components. For example, "a processor configured to perform A, B, and C" may refer, for example, and without limitation, to a dedicated processor (e.g., an embedded processor) for performing a corresponding operation or a generic-purpose processor (e.g., Central Processing Unit (CPU) or an Application Processor (AP)) capable of performing corresponding operations by executing one or more software programs stored in a memory device.

Terms used in the present disclosure are for the purpose of describing particular embodiments only and are not intended to limit other example embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present disclosure should not be interpreted to exclude the example embodiments of the present document.

An electronic device according to various example embodiments of the present document may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device, or the like, but is not limited thereto. According to various example embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit), or the like, but is not limited thereto.

According to certain example embodiments, the electronic device may be a home appliance. The home appliance may include, for example, at least one of a Television (TV), a Digital Video Disk (DVD) player, an audio player, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, and an electronic picture frame, or the like, but is not limited thereto.

According to other example embodiments, the electronic device may include at least one of various medical devices (e.g., various portable medical measuring devices (e.g., a blood sugar measuring device, a hear rate measuring device, a blood pressure measuring device, a body temperature measuring device, etc.), Magnetic Resonance Angiography (MRA), Magnetic Resonance Imaging (MRI), Computed Tomography (CT), imaging equipment, ultrasonic instrument, etc.)), a navigation device, a Global Navigation Satellite System (GNSS), an Event Data Recorder (EDR), a Flight Data Recorder (FDR), a car infotainment device, an electronic equipment for ship (e.g., a vessel navigation device, a gyro compass, etc.), avionics, a security device, a car head unit, an industrial or domestic robot, an Automatic Teller's Machine (ATM) of financial institutions, Point Of Sales (POS) of shops, and Internet of things (e.g., a light bulb, various sensors, an electric or gas meter, a sprinkler device, a fire alarm, a thermostat, a streetlamp, a toaster, a fitness equipment, a hot water tank, a heater, a boiler, etc.), or the like, but is not limited thereto.

According to certain example embodiments, the electronic device may include at least one of furniture or a part of buildings/constructions, an electronic board, an electronic signature input device, a projector, and various measurement machines (e.g., water supply, electricity, gas, propagation measurement machine, etc.), or the like, but is not limited thereto. In various example embodiments, the electronic device may be one or more combinations of the aforementioned various devices. According to certain example embodiments, the electronic device may be a flexible device. Further, the electronic device according to an example embodiment of the present document is not limited to the aforementioned devices, and may include a new electronic device depending on technical progress.

Hereinafter, an electronic device according to various example embodiments will be described with reference to the accompanying drawings. The term "user" used in the present disclosure may refer to a person who uses the electronic device or a device which uses the electronic device (e.g., an Artificial Intelligence (AI) electronic device).

FIG. 1 is a perspective view illustrating an example wearable electronic device according to various example embodiments of the present disclosure.

Referring to FIG. 1, an electronic device 100 is a wearable electronic device which can be worn on a user's wrist. According to an example embodiment, the electronic device 100 may include a main body 110 and one pair of straps 120 and 130 (e.g., a connecting member, a fastening member, a chain member, etc.) placed respectively at both ends of the main body 110. According to an example embodiment, the electronic device 100 may be worn on the user's wrist by winding the one pair of straps 120 and 30 on the wrist in a state where the main body 110 is placed on the wrist. According to an example embodiment, a buckle member (not shown) may be disposed to one strap 120 between the straps 120 and 130, and a joining portion (not shown) may be formed on the other strap 130 to join the buckle member.

According to various example embodiments, the main body 110 may include a housing 111. According to an example embodiment, the housing 111 may be formed of or comprise a metal material. According to an example embodiment, the main body 110 may include a display 112 disposed above or through the housing 111. According to an example embodiment, the display 112 may be utilized as a touch screen including a touch sensor. According to an example embodiment, the display 112 may include a pressure sensor to sense pressure by which an exposure surface of the display is pressed. According to an example embodiment, the main body 110 may include a ring-shaped member 113 disposed to encompass the display 112 in a rotatable manner. According to an example embodiment, the ring-shaped member 113 may be installed to encompass at least one portion of the display 112 disposed to the housing 111. According to an example embodiment, the electronic device 100 may also be disposed in a rotatable bezel manner if it is a wrist-wearable electronic device. According to an example embodiment, the ring-shaped member 113 may rotate in a clockwise or counter-clockwise direction, or may be configured such that a rotation amount is limited to up to 360 degrees or may be configured to rotate limitlessly. According to an example embodiment, the electronic device 100 may detect a rotation parameter (e.g., a rotation direction, a rotation speed, a rotation amount, etc.) of the ring-shaped member 113 and may perform a corresponding function based on the detected parameter.

According to various example embodiments, at least one key button (not shown) may be disposed at a proper position of the housing 111. According to an example embodiment, the electronic device 100 may have a battery (e.g., a charging battery, etc.) applied therein as a power supply means, and a coil member for wireless charging may be disposed to charge the battery. According to an example embodiment, the electronic device 100 may include at least one antenna device for communication. According to an example embodiment, the antenna device may be disposed in such a manner that at least one conductive pattern (e.g., an antenna radiation pattern) is disposed inside the electronic device 100 in various manners. According to an example embodiment, the electronic device 100 may be implemented such that a specific portable charging cradle (e.g., a wired or wireless charging cradle) is selectively placed to charge the battery.

Although not shown, the housing 111 may include at least one sensor device disposed in at least one region. According to an example embodiment, the sensor device may include, for example, and without limitation, at least one of a camera sensor, a fingerprint recognition sensor, an infrared sensor, an HRM sensor, an ultrasonic sensor, a photo sensor, a proximity sensor, an illumination sensor, a temperature sensor, and an iris recognition sensor.

According to various example embodiments, the pair of straps 120 and 130 may include the first strap 120 and the second strap 130. According to an example embodiment, the pair of straps 120 and 130 may be formed of or comprise a metal material. According to an example embodiment, the first strap 120 may be fixed to a first strap joining portion 114 of the housing 111. According to an example embodiment, the second strap 130 may be fixed to the second strap joining portion 115 of the housing 111.

According to various example embodiments, the first strap 120 may include a plurality of unit links 121, 122, 123, 124, or the like which are joined to each other and are connected to each other in a rotatable manner to have a specific length that forms a length of the first strap 120. According to an example embodiment, the unit links 121, 122, 123, 124, or the like may be formed of or comprise a metal material, and may have the same length or different lengths. According to an example embodiment, among the plurality of unit links, one unit link 121 disposed at one end may be referred to as the first coupling member 121 joined to the first strap joining portion. According to an example embodiment, the first coupling member 121 may be joined to the first strap joining portion 114 of the housing by means of a hinge pin (e.g., 340 of FIG. 3B). According to an example embodiment, the second strap 130 may also have a plurality of links that form a length of the second strap similarly to the first strap 120, and among the plurality of unit links, a unit link disposed at one end may be referred to as a second coupling member 131 to be joined to the second strap joining portion 115 of the housing 111.

According to various example embodiments, the electronic device 100 may be formed of or comprise a metal material for the purpose of reinforcing rigidity and improving a design of an outer look. In particular, the metallic housing 111 may be used as an antenna radiator by being electrically connected with a communication circuit disposed inside the housing in at least one region. According to an example embodiment, the housing 111 may be electrically connected to the communication circuit in different feeding positions F1 and F2 so as to be used as multiple band antenna radiators which operate in different frequency bands.

According to various example embodiments, when the housing 111 is used as the antenna radiator, the electronic device 100 may experience deterioration in a radiation characteristic due to the metal straps 120 and 130 which are physically in contact with the housing 111. According to an example embodiment, the metal straps 120 and 130 may operate as undesired conductors of the metallic housing 111 used as the antenna radiator, and thus operate as a radiation-hindering factor of the antenna radiator by operating as an undesired factor by which, for example, a radiation direction of electric current is distorted or strength of electric current deteriorates. According to an example embodiment, the electronic device 100 may apply an insulation structure between the metallic housing 111 and the metallic straps 120 and 130 in an effort to reduce and/or eliminate deterioration of the radiation characteristic of the housing when it is used as an antenna.

Hereinafter, although any one strap joining structure is described between the one pair of strap joining structures, the other strap joining structure may also be configured in the same manner. In addition, it may also be applied to a strap joining structure in which, instead of one pair of straps, both end portions of one strap are respectively joined to the first and second joining portions of the housing.

Figure 2A:
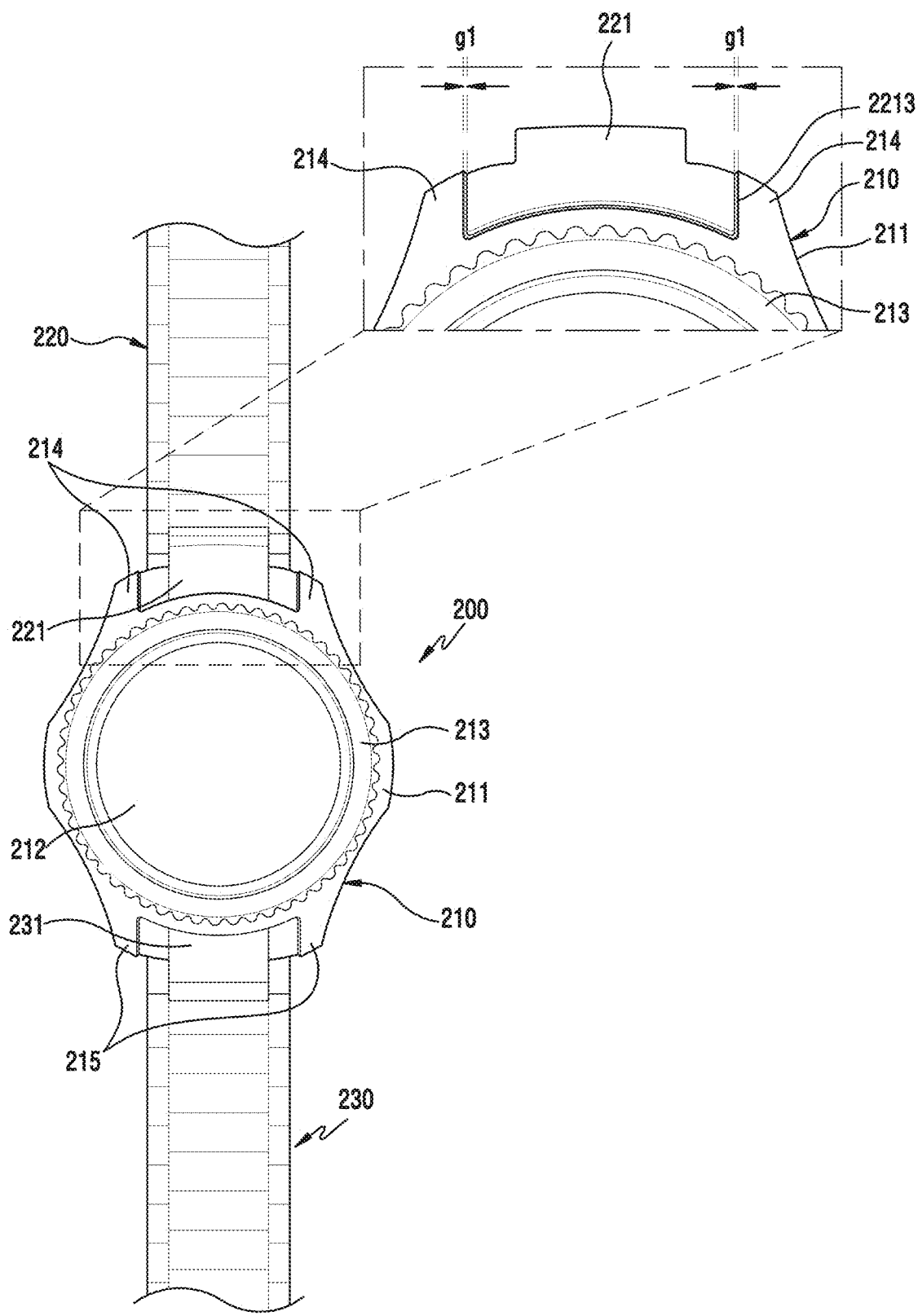
FIG. 2A is a diagram illustrating an example connection structure of a strap and a main body of a wearable electronic device according to various example embodiments of the present disclosure.
Figure 2B:
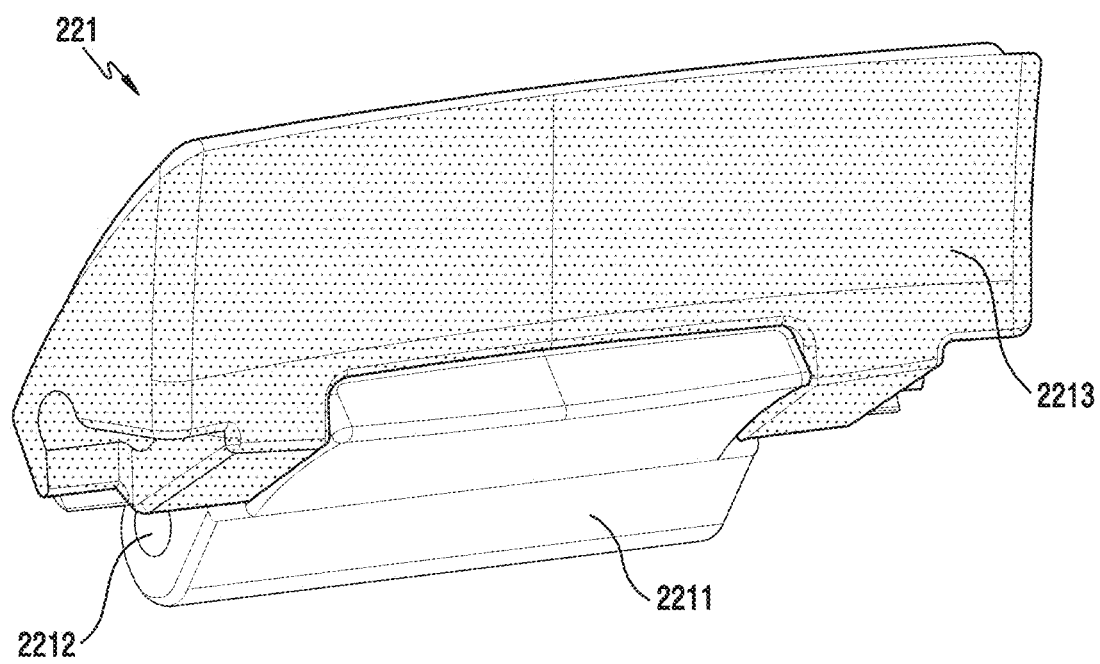
FIG. 2B is a perspective view illustrating an example structure of a coupling member of a strap according to various example embodiments of the present disclosure.

FIG. 2A is a diagram illustrating an example connection structure of a strap and a main body of a wearable electronic device according to various example embodiments of the present disclosure. FIG. 2B is a perspective view illustrating an example structure of a coupling member of a strap according to various example embodiments of the present disclosure.

An electronic device 200 of FIG. 2A and FIG. 2B may be similar to the electronic device 100 of FIG. 1, or may include another example of the electronic device.

Referring to FIG. 2A, the electronic device 200 may include a main body 210 including a metal housing 211, and a pair of straps 220 and 230 disposed respectively to both opposite ends of the main body 210. According to an example embodiment, the main body 210 may include a display 212 and ring-shaped member 213 capable of performing functions similar to those described above. According to an example embodiment, one strap 220 may be coupled to the main body 210 in such a manner that a first coupling member 221 disposed at an end portion thereof is joined to a first strap joining portion 214 of the metal housing 211, and the other strap 230 may be coupled in such a manner that a second coupling member 231 disposed at an end portion thereof is joined to a second strap joining portion 215 of the metal housing 211. According to an example embodiment, the electronic device 200 may be used as an antenna radiator which operates in at least one frequency band in such a manner that at least one region of the metal housing 211 is electrically connected to a communication circuit.

According to various example embodiments, the electronic device 200 may be configured to avoid an electrical contact of the metallic housing 211 and the metallic first strap 220 by including a non-conductive member 2213 comprising a non-conductive or electrically insulating material disposed between the first coupling member 221 disposed at an end portion of the first strap 220 and the first strap joining portion 214 of the metal housing 211. According to an example embodiment, a gap g1 with a specific interval is formed on a contact surface between the first strap joining portion 214 of the metal housing 211 and the first coupling member 221 due to the non-conductive member 2213.

According to various example embodiments, the non-conductive member 2213 may include, for example, and without limitation, at least one of rubber, urethane, silicone, and synthetic resin (e.g., PC). According to an example embodiment, the non-conductive member 2213 may be disposed to at least one of a contact surface of the first coupling member 221 of the first strap 220 and a contact surface of the first strap joining portion 213 of the metal housing 211. According to an example embodiment, the non-conductive member 2213 may be disposed on the first strap joining portion 214 of the metal housing 211 and/or the first coupling member 221 of the first strap 220 using at least one of an attaching process, a molding process, a double-injection process, and a coating process.

According to various example embodiments, the second coupling member 231 of the second strap 230 may include a non-conductive member similarly to the first strap 220 and thus may be joined to the second strap joining member 215 of the metal housing 211 such that an electric connection thereto is insulated.

Referring to FIG. 2B, the non-conductive member 2213 may be disposed on the coupling member 221. According to an example embodiment, the coupling member 221 may include a body 2211 including a hinge pin through-hole 2212, and the non-conductive member 2213 disposed on at least one region in an outer surface of the body 2211. According to an example embodiment, the non-conductive member 2213 may be disposed to cover a contact surface on which the coupling member 221 is in contact with a strap joining portion (e.g., 214 or 215 of FIG. 2) of a metal housing (e.g., 211 of FIG. 2). According to an example embodiment, the non-conductive member 2213 may include, for example, and without limitation, at least one of rubber, urethane, silicone, and synthetic resin (e.g., PC). According to an example embodiment, the non-conductive member 2213 may be disposed to a contact surface in contact with the strap joining member (e.g., 214 or 215 of FIG. 2A) of the metal housing (e.g., 211 of FIG. 2A) in the outer surface of the body 2211 of the coupling member 221 using, for example, and without limitation, at least one of an attaching process, a molding process, a double-injection process, and a coating process.

Figure 3A:
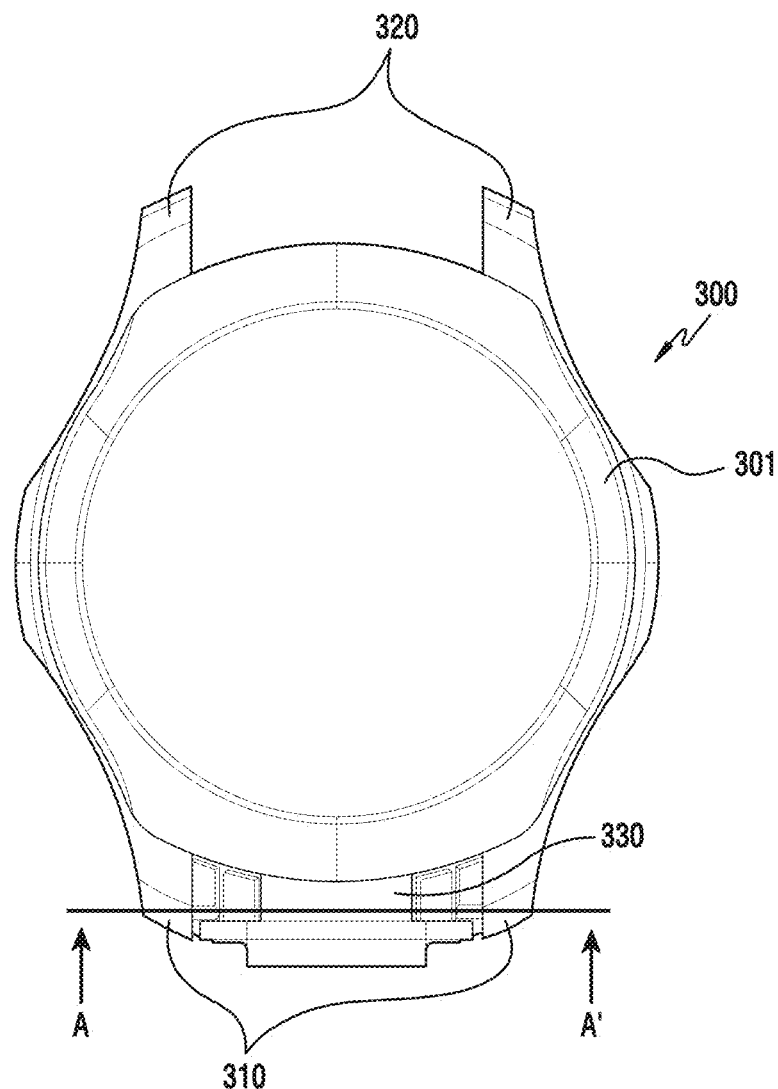
FIG. 3A is a diagram illustrating an example state where a strap is coupled to a main body according to various example embodiments of the present disclosure.
Figure 3B:
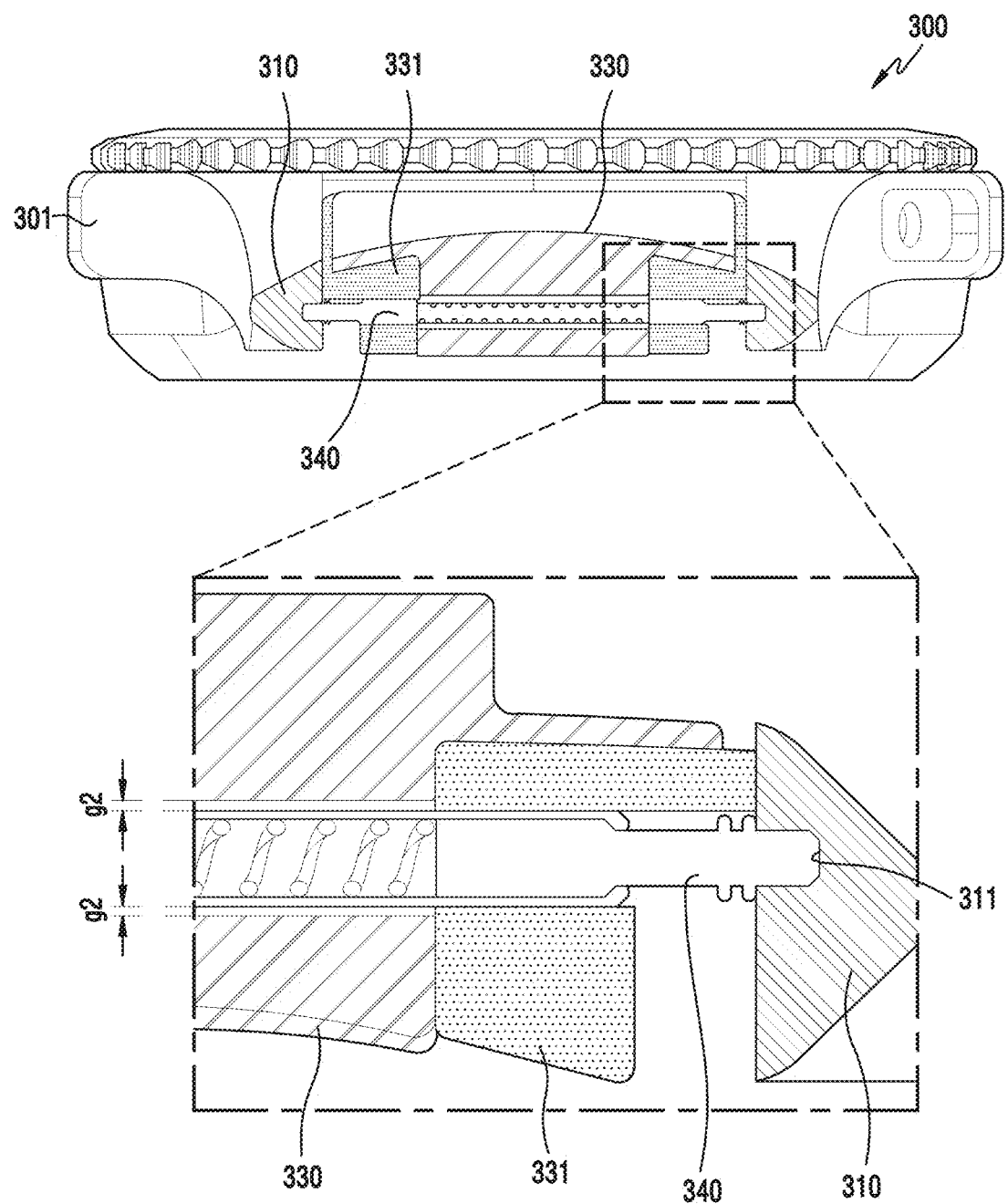
FIG. 3B is a cross-sectional view cut along the line A-A' of FIG. 3A according to various example embodiments of the present disclosure.

FIG. 3A is a diagram illustrating an example state where a strap is coupled to a main body according to various example embodiments of the present disclosure. FIG. 3B is a cross-sectional view cut along the line A-A' of FIG. 3A according to various example embodiments of the present disclosure.

An electronic device 300 of FIG. 3A and FIG. 3B may be similar to the electronic device 100 of FIG. 1 or the electronic device 200 of FIG. 2, or may include another example of the electronic device.

Referring to FIG. 3A and FIG. 3B, for convenience of explanation, only a coupling member 330 disposed at an end portion of a strap is illustrated by excluding a plurality of unit links. It will be understood that a coupling member of another strap may be joined to strap joining portion 320 of the metal housing in a similar manner. According to an example embodiment, the coupling member 330 may be joined to a strap joining portion 310 of a metal housing 301 by means of a hinge pin 340. According to an example embodiment, the hinge pin 340 may be disposed to penetrate the coupling member 330, and may fix the coupling member 330 to the metal housing 301 in such a manner that both end portions are mounted to a pin joining hole 311 formed on an inner surface of the strap joining portion 310.

According to various example embodiments, the non-conductive member 331 may be disposed on an outer surface of the coupling member 330 to have a specific area and a specific thickness. According to an example embodiment, the non-conductive member 331 may include, for example, and without limitation, at least one of rubber, urethane, silicone, and synthetic resin (e.g., PC). According to an example embodiment, the non-conductive member 331 may be disposed to have a specific thickness in at least one region of the outer surface of the coupling member 330 using, for example, and without limitation, at least one of an attaching process, a molding process, a double-injection process, and a coating process. According to an example embodiment, the hinge pin 340 may penetrate the coupling member 330, and may be disposed in such a manner that both ends thereof protrude to the outside through the non-conductive member 331 after it is fixed to the non-conductive member 331. This is to prevent the metal housing 301 and the coupling member 331 from being electrically connected by means of the hinge pin 340 when the hinge pin 340 may also be formed of or comprise a metal material.

According to various example embodiments, the hinge pin 340 is disposed to have a specific gap g2 in a penetration region of the coupling member 330, and thus is not electrically connected to the hinge pin 340 in the penetration region of the coupling member 330. Therefore, the hinge pin 340 may maintain a state of being electrically disconnected (e.g., insulated) due to the gap g2 formed between the coupling member 330 and the hinge pin 331 even if both ends are joined to the strap joining portion 310 of the metal housing 301 after penetrating the coupling member 330 and the non-conductive member 331. According to an example embodiment, the coupling member 330 may also provide an insulation structure by being penetrated to be in contact with the coupling member 330 after being formed such that another non-conductive member surrounds an outer circumferential surface of the hinge pin 331.

According to various example embodiments, the hinge pin 340 may be formed of or comprise a non-conductive material. In this case, when the hinge pin 340 penetrates the coupling member, there is no need to form a separate gap in a corresponding region, and another non-conductive member disposed to the outer surface of the hinge pin 340 may be unnecessary.

Figure 4:
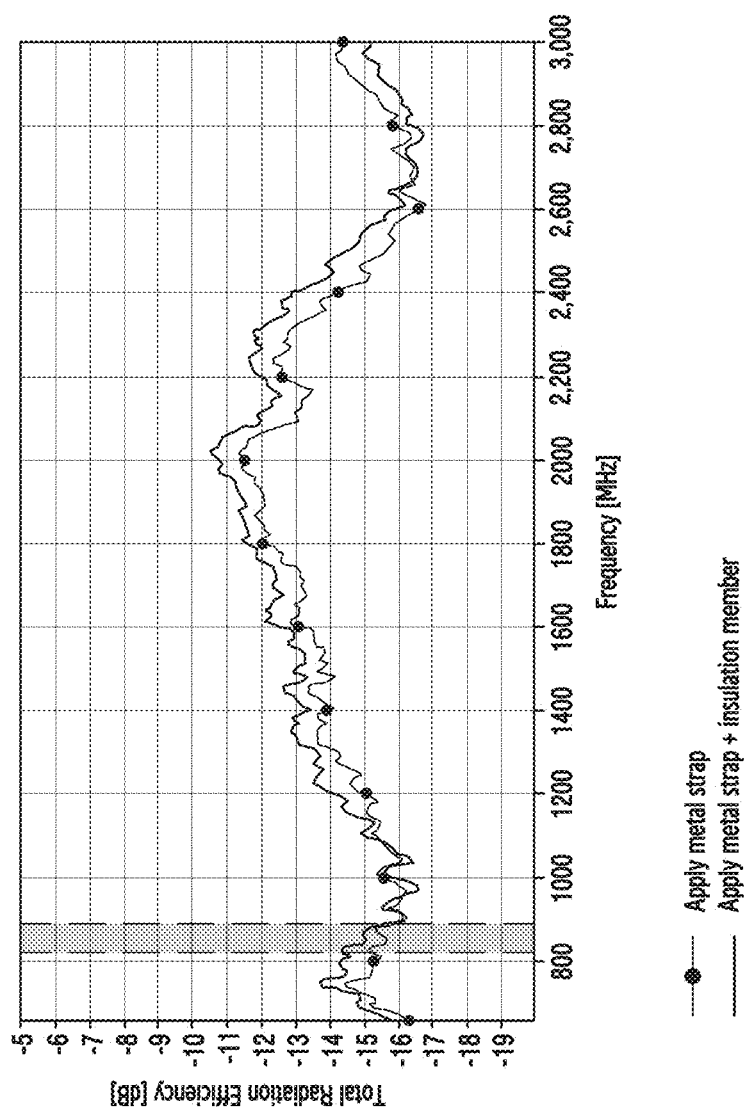
FIG. 4 is a graph illustrating radiation efficiency of an example wearable electronic device in which a metal housing is used as an antenna according to various example embodiments of the present disclosure.

FIG. 4 is a graph illustrating radiation efficiency of a wearable electronic device in which a metal housing is used as an antenna according to various example embodiments of the present disclosure.

The graph of FIG. 4 illustrates radiation efficiency of an antenna radiator based on whether a non-conductive member is applied in a structure of coupling with a strap when the metal housing is used as a radiator. It can be seen that radiation efficiency (−14.9 dB) of an antenna radiator to which a non-conductive member is applied in a low band is superior to radiation efficiency (−15.5 dB) of an antenna radiation to which the non-conductive member is not applied.

Although the non-conductive member may be disposed between the metal housing and the coupling member of the strap to induce the electrical disconnection as described above, when a thickness of the non-conductive member is increased, it may have an adverse effect on a slimness of the electronic device, and when the thickness is not sufficient, even if the coupling member and the metal housing are separated from each other, it may cause deterioration in radiation performance of the antenna radiation due to a coupling phenomenon. Accordingly, the following drawings illustrate and describe a structure in which the strap can be grounded to an inner substrate inside the metal housing while applying the non-conductive member.

Figure 5A:
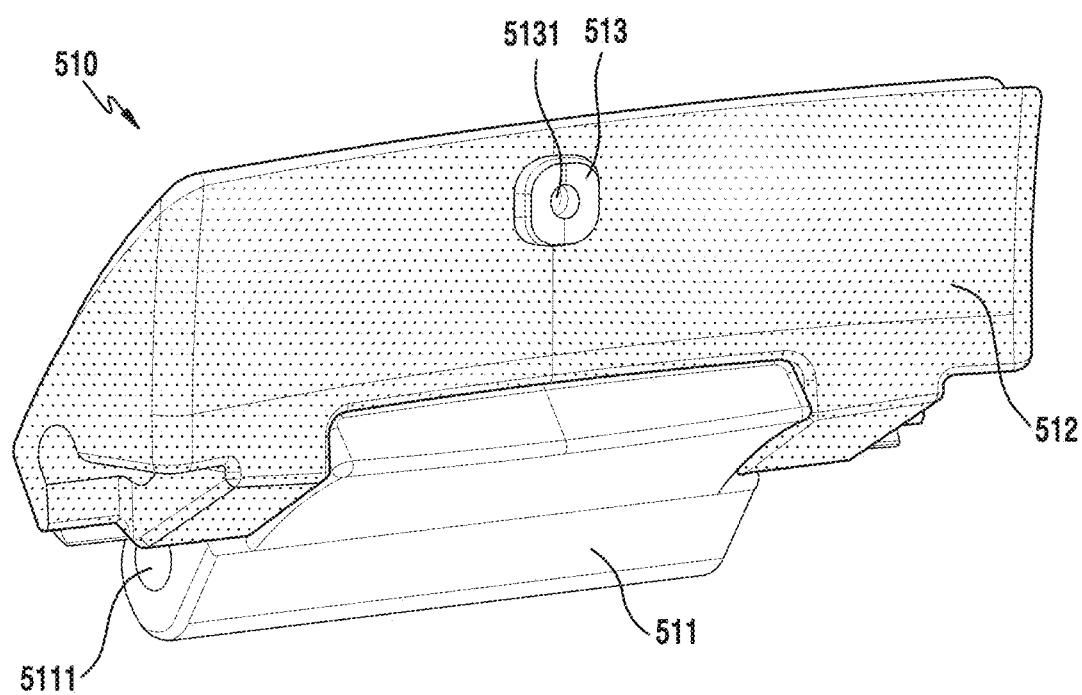
FIG. 5A and FIG. 5B are diagrams illustrating an example structure of a coupling member according to various example embodiments of the present disclosure.
Figure 5B:
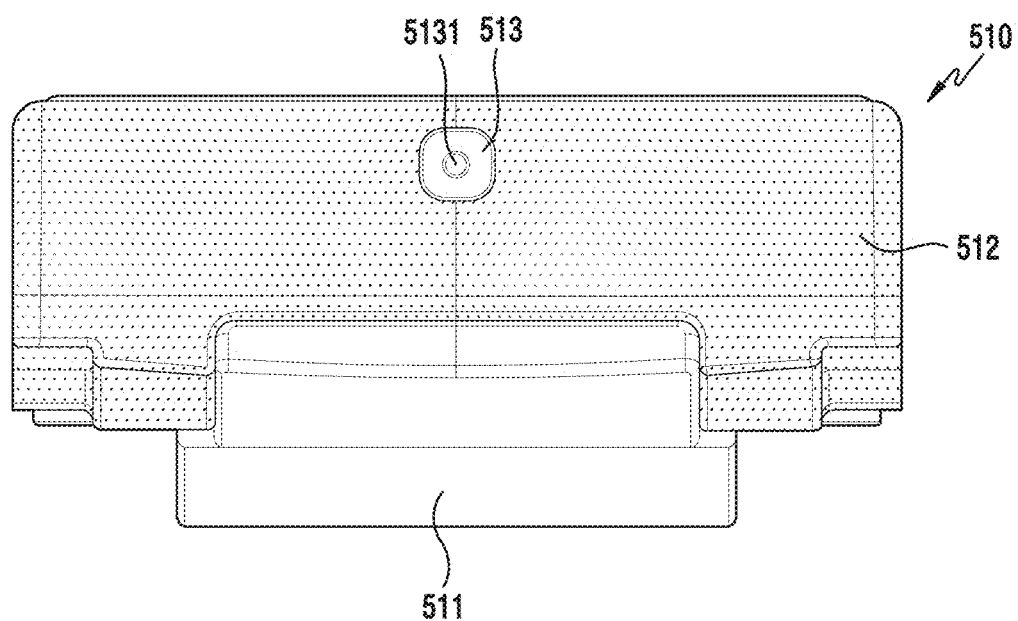

FIG. 5A and FIG. 5B are diagrams illustrating an example structure of a coupling member according to various example embodiments of the present disclosure.

Referring to FIG. 5A and FIG. 5B, a coupling member 510 may include a body 511 including a hinge pin throughhole 5111, and a non-conductive member 512 disposed at a proper position of an outer surface of the body 511. According to an example embodiment, the coupling member 510 may include a protrusion 513 formed of or comprising a metal material and protruding from at least one region of the non-conductive member 512. According to an example embodiment, the protrusion 513 may include a port inserting groove 5131 formed substantially in a center thereof. According to an example embodiment, the protrusion 513 may be formed integrally with the body 511, and may be disposed to protrude to the outside in an extended manner from at least one region of the non-conductive member 512. However, the present disclosure is not limited thereto, and thus the protrusion 513 may be prepared as a separate member and may be disposed to be fixed to the metallic body 511 by penetrating the non-conductive member 512.

Figure 6A:
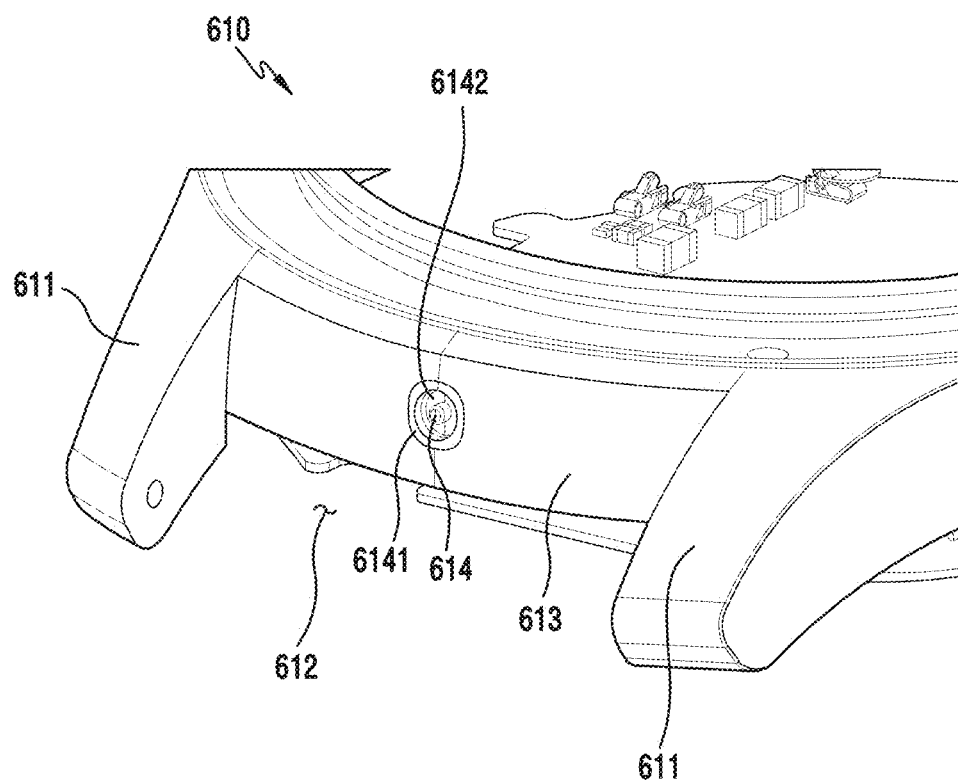
FIG. 6A and FIG. 6B are diagrams illustrating an example structure of a main body of a wearable electronic device to which a coupling member of FIG. 5A
Figure 6B:
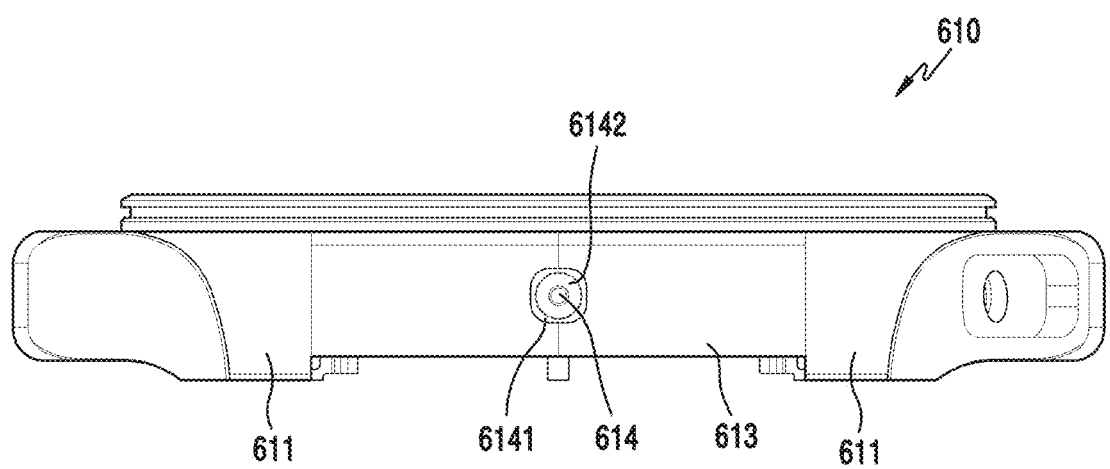

FIG. 6A and FIG. 6B are diagrams illustrating an example structure of a main body of a wearable electronic device to which a coupling member of FIG. 5A and FIG. 5B is coupled according to various example embodiments of the present disclosure.

Referring to FIG. 6A and FIG. 6B, a metal housing 610 may include a pair of strap joining portions 611 to which a coupling member (e.g., 510 of FIG. 5A) is joined. According to an example embodiment, the pair of strap joining portions 611 may be spaced apart by a specific interval, and a member accommodating space 612 may be provided up to a member contact surface 613 of the metal housing 610 in a center to accommodate a coupling member (e.g., 510 of FIG. 5A). According to an example embodiment, when the coupling member (e.g., 510 of FIG. 5A) is joined, a protrusion accommodating portion 6141 may be disposed to the member contact surface 613 at a position corresponding to a protrusion (e.g., 513 of FIG. 5A) of the coupling member (e.g., 510 of FIG. 5A). According to an example embodiment, the protrusion accommodating portion 6141 may include a recess 6142 on which the protrusion (e.g., 513 of FIG. 5A) can be mounted. According to an example embodiment, when the protrusion (e.g., 513 of FIG. 5A) is mounted, a port 614 may be disposed in the recess 6141 in a protrusion manner to be inserted to a port inserting groove (e.g., 5131 of FIG. 5A). According to an example embodiment, the port 614 may be provided at one end of an electrical connecting member (e.g., 630 of FIG. 7A) electrically connected to a substrate (e.g., 620 of FIG. 7A) disposed inside the metal housing 610. According to an example embodiment, the protrusion accommodating portion 6141 may be formed of or comprise a non-conductive material, and may be disposed to be exposed to the metal housing 610. According to an example embodiment, the protrusion accommodating portion 6141 may be disposed using, for example, and without limitation, at least one of an insert-molding process, an insert-injection process, and a double-injection process, and may guide such that the protrusion (e.g., 513 of FIG. 5A) of the coupling member (e.g., 510 of FIG. 5A) is electrically connected only to the port 614.

Figure 7A:
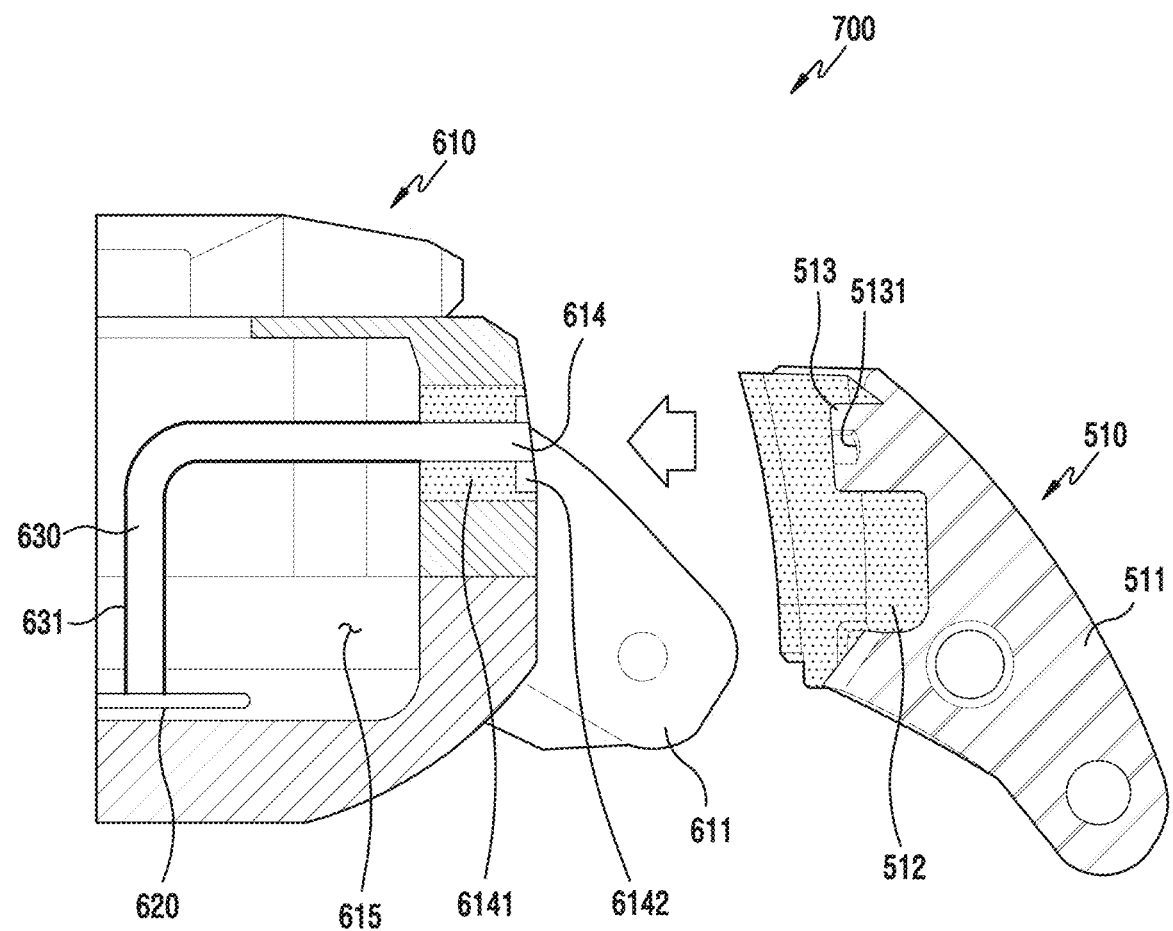
FIG. 7A and FIG. 7B are diagrams illustrating an example state of a strap being coupled to a coupling member of FIG. 5A and FIG. 5B and a main body of FIG. 6A and FIG. 6B according to various example embodiments of the present disclosure.
Figure 7B:
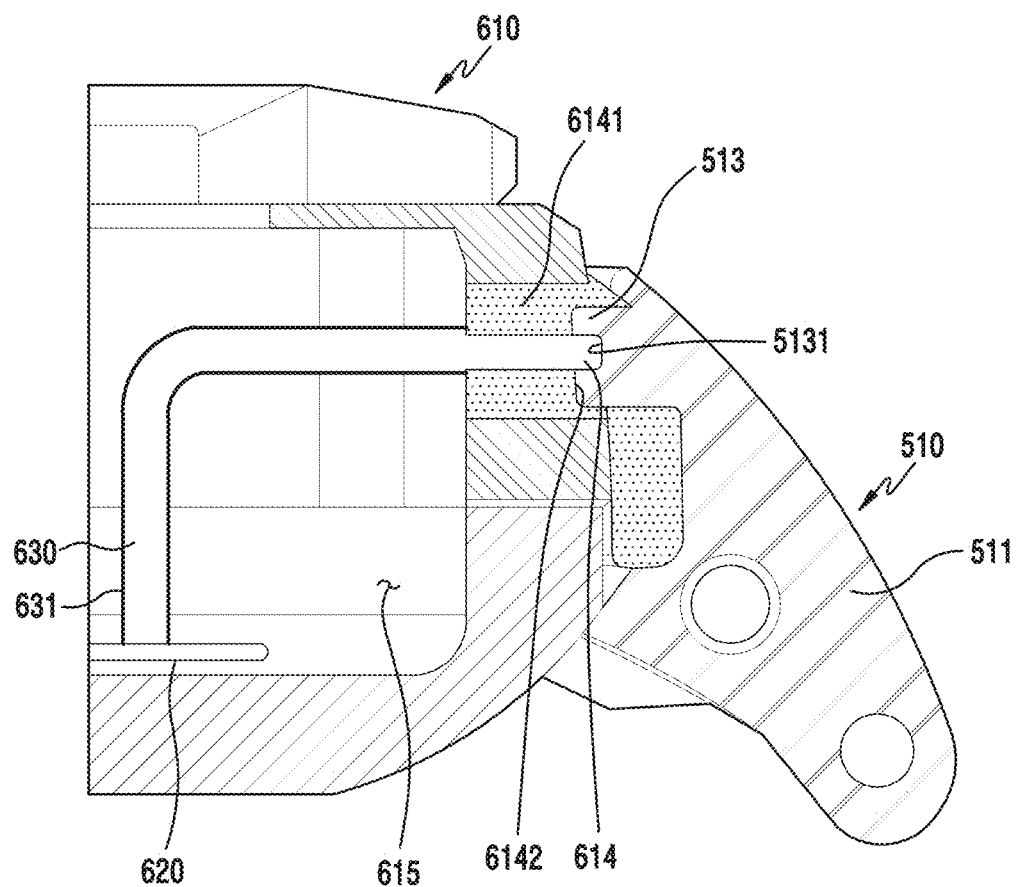

FIG. 7A and FIG. 7B are diagrams illustrating an example state of being coupled to a coupling member of FIG. 5A and FIG. 5B and a main body of FIG. 6A and FIG. 6B according to various example embodiments of the present disclosure.

Referring to FIG. 7A and FIG. 7B, the metal housing 610 may include a substrate 620 in an inner space 615 thereof. According to an example embodiment, the metal housing 610 may include an electrical coupling member 630 of which one end is electrically connected to a ground GND of the substrate 620 and the other end is extended to the protrusion accommodating portion 6141 of the metal housing 610 to serve as the port 614. According to an example embodiment, the electrical coupling member 630 may include a session cable having an enough length to be extended to up to the protrusion accommodating portion 6141 of a lateral surface in the substrate 620 disposed to the inner space 615 of the metal housing 610. According to an example embodiment, the electrical coupling member 630 may include a surface covering member 631 which insulates an outer circumferential surface of the electrical coupling member 630 through surface covering to prevent and/or reduce deterioration in radiation performance of an antenna radiator and deterioration in performance of an internal electronic component.

According to various example embodiments, if the coupling member 510 is joined to the strap joining portion 611 of the metal housing 610, the protrusion 513 of the coupling member 510 may be coupled to be mounted on the recess 6142 of the protrusion accommodating portion 6141 of the metal housing 610. According to an example embodiment, at the same time, the port 614 which protrudes from the recess 6142 of the metal housing 610 may be physically in contact with and electrically in contact with the coupling member 510 by being inserted to the port inserting groove 5131. Accordingly, the coupling member 510 may be configured in such a manner that only the protrusion 513 is electrically connected to the port 614 of the metal housing 610 without an electrical connection with the metal housing, and as a result, the metal strap connected to the coupling member 510 is grounded to an electronic device 700 so as not to have an effect on radiation performance of the antenna radiator.

According to various example embodiments, the substrate 620 may be disposed inside the metal housing 610. According to an example embodiment, the substrate 620 may include a communication circuit (not shown), and at least one region may be electrically connected to a corresponding region of the metal housing 610 used as the antenna radiator by performing an operation of placing the substrate 620 to the metal housing 610. According to an example embodiment, the substrate may include a ground region (not shown). According to an example embodiment, one end of the electrical coupling member 630 may be electrically connected to the ground region of the substrate. According to an example embodiment, the electrical coupling member 630 may, for example, and without limitation, be directly soldered to the ground region of the substrate 610 or may be fixed by means of a separate clipping member (e.g., a C-clip, etc.), a taping member (e.g., a conductive tape, etc.), or a conductive bonding member.

Figure 8A:
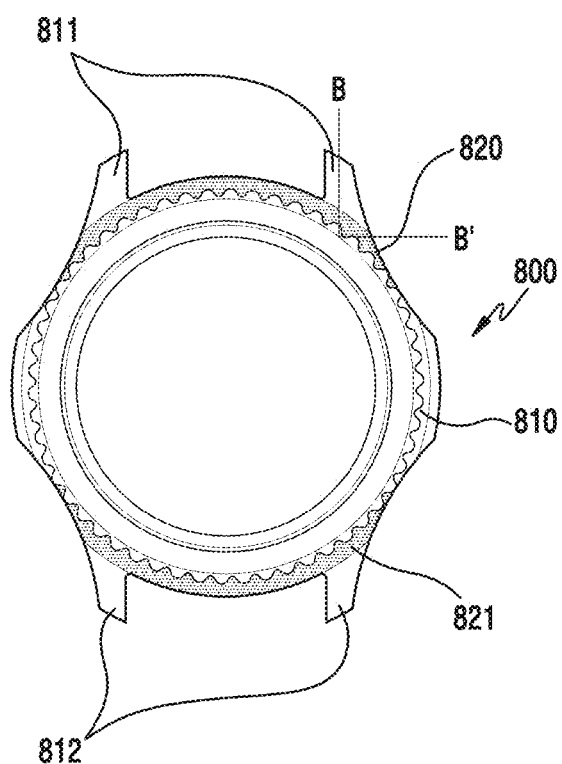
FIG. 8A and FIG. 8B are diagrams illustrating an structure of a metal housing of a wearable electronic device according to various example embodiments of the present disclosure.
Figure 8B:
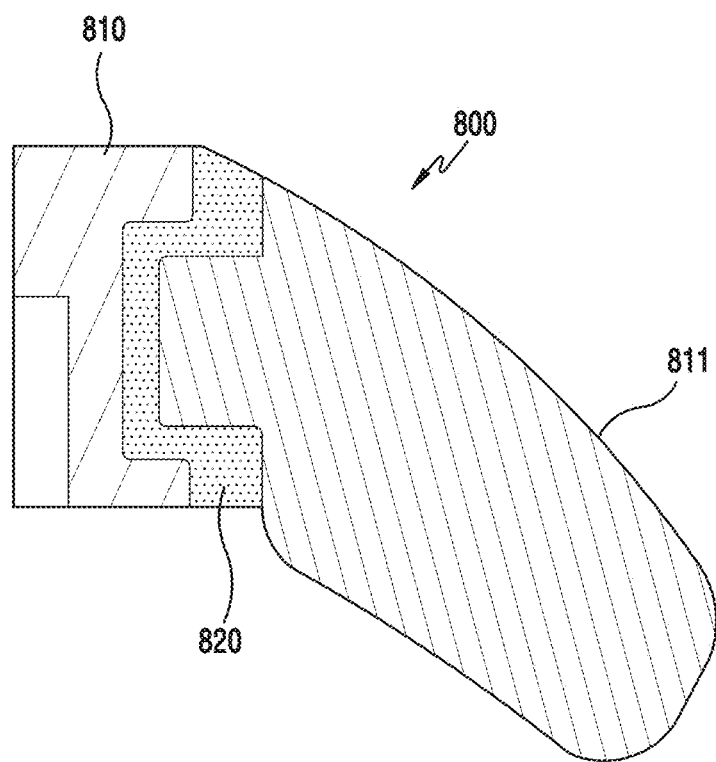

FIG. 8A and FIG. 8B are diagrams illustrating an example structure of a metal housing of a wearable electronic device according to various example embodiments of the present disclosure. FIG. 8B is a cross-sectional view cut along the line B-B' of FIG. 8A.

Referring to FIG. 8A and FIG. 8B, a metal housing 800 may include a main body portion 810 and a pair of strap joining portions 811 and 812 disposed to the main body portion 810 in opposite directions. According to an example embodiment, the main body portion 810 of the metal housing 800 may be used as an antenna radiator which is electrically connected to a communication circuit disposed inside thereof in at least one region and which operates in at least one frequency band. According to an example embodiment, a coupling member connected to an end portion of the metal strap may be joined to the strap joining portions 811 and 812.

According to various example embodiments, the metal housing 800 may include non-conductive members 820 and 821 disposed between the main body portion 810 and the strap joining portions 811 and 812 so that these elements are electrically disconnected (e.g., insulated) from each other. According to an example embodiment, the non-conductive members 820 and 821 may include, for example, and without limitation, a synthetic resin (e.g., PC) material. According to an example embodiment, the non-conductive members 820 and 821 may be disposed between the metallic main body portion 810 and strap joining portions 811 and 812 using, for example, and without limitation, at least one of an insert-molding process, an insert-injection process, and a double-injection process. According to an example embodiment, in order to remove heterogeneity between the non-conductive members 820 and 821 and the metallic main body portion 810 and strap joining portions 811 and 812, a flattening operation may be performed after injection, and a coating film may be used to implement integrity. Therefore, even if a metal strap is joined to the strap joining portions 811 and 812 by means of the non-conductive members 820 and 821 disposed between the main body portion 810 and the strap joining portions 811 and 812 of the metal housing 800, the main body portion 810 which operates as an antenna radiator by means of the non-conductive members 820 and 821 is not electrically connected to the metal strap, thereby preventing and/or reducing deterioration in radiation performance.

Figure 9A:
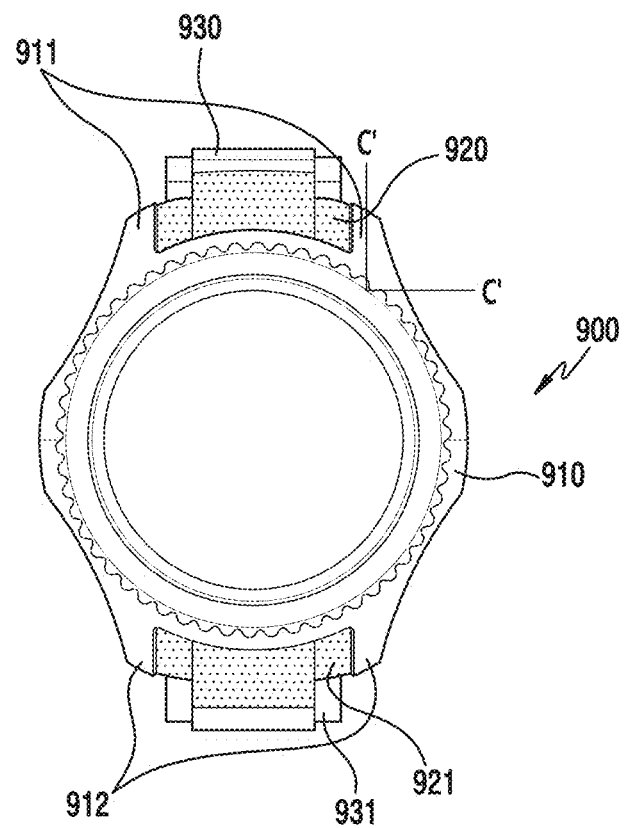
FIG. 9A and FIG. 9B are diagrams illustrating an example state where a coupling member of a wearable electronic device is coupled to a main body according to various example embodiments of the present disclosure.
Figure 9B:
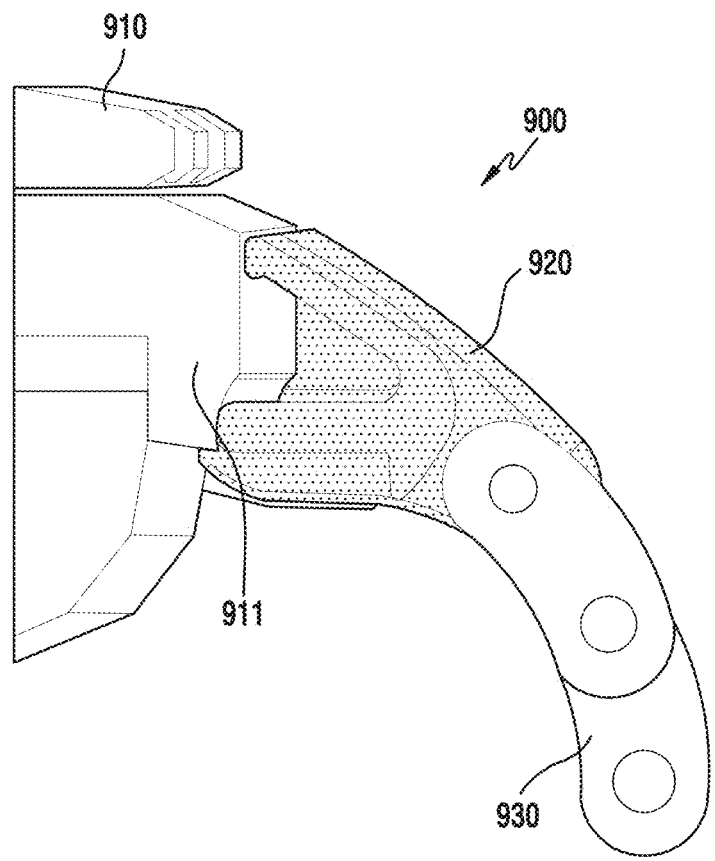

FIG. 9A and FIG. 9B are diagrams illustrating an example state where a coupling member of a wearable electronic device is coupled to a main body according to various example embodiments of the present disclosure. FIG. 9B is a cross-sectional view cut along the line C-C' of FIG. 9A.

Referring to FIG. 9A and FIG. 9B, an electronic device 900 may include a metal housing 910, a pair of strap joining portions 911 and 912 disposed in opposite directions of the metal housing 910, and a pair of metal straps 930 and 931 respectively coupled to the strap joining portions 911 and 912. According to an example embodiment, the metal housing 910 may be used as an antenna radiator which is electrically connected in at least one region to a communication circuit disposed inside the electronic device 900 and which operates in at least one frequency band.

According to various example embodiments, each of the metal straps 930 and 931 may prevent an electrical connection between the metal straps 930 and 931 and the metal housing 910 in such a manner that the coupling members 920 and 921 coupled to the strap joining portions 911 and 912 of the metal housing 910 and disposed to the most end portion are replaced with a non-conductive member. Also, in order to remove heterogeneity between the coupling members 920 and 921 formed of the non-conductive member and the metal housing 910 and the metal straps 930 and 931, a coating film of a metal texture may be applied to the coupling members 920 and 921.

According to various example embodiments, the metal housing 910 which operates as an antenna radiator is not electrically connected to the metal straps 930 and 931 even if the metal straps 930 and 931 are joined to the strap joining portions 911 and 912 by means of the non-conductive coupling members 920 and 921 disposed between the metal straps 930 and 931 and the strap joining portions 911 and 912 of the metal housing 910, thereby preventing deterioration in radiation performance.

According to various example embodiments, a wearable electronic device disconnects (e.g., insulates) an electrical connection in such a manner that a non-conductive member is disposed between a metal strap and a metal housing in which at least one region is used as an antenna radiator, thereby preventing deterioration in radiation performance of the antenna radiator.

According to various example embodiments, a wearable electronic device may include a metal housing used as an antenna radiator by being electrically connected to a communication circuit, at least one metal strap coupled to at least one region of the metal housing, and a non-conductive member disposed between the metal strap and the metal housing. The non-conductive member may electrically insulate or disconnect the metal strap and the metal housing.

According to various example embodiments, the non-conductive member may be disposed on a contact surface of a coupling end portion of the metal strap coupled to the metal housing.

According to various example embodiments, the non-conductive member may be disposed on a contact surface of the metal housing coupled to an end portion of the metal strap.

According to various example embodiments, the non-conductive member may include at least one of: rubber, urethane, silicon, and synthetic resin.

According to various example embodiments, the non-conductive member may be disposed on at least one of a contact surface of the metal housing and a contact surface of the metal strap using, for example, and without limitation, at least one of an attaching process, a molding process, a double-injection process, and a coating process.

According to various example embodiments, the wearable electronic device may include a metallic coupling member coupled to an end portion of the metal strap, joined to a strap joining portion of the metal housing, and having the non-conductive member disposed on a contact surface, and a hinge pin disposed in such a manner that both ends protrude to penetrate the coupling member and the non-conductive member. The coupling member may be joined to the metal housing in such a manner that the protruding end portion of the hinge pin is joined to the strap joining portion of the metal housing.

According to various example embodiments, the hinge pin may be fixed to the non-conductive member using an injection process.

According to various example embodiments, the hinge pin may be disposed to be spaced apart by a specific interval from the coupling member while penetrating the coupling member.

According to various example embodiments, a penetration portion in the coupling member of the hinge pin may include surface covering using another non-conductive member.

According to various example embodiments, the wearable electronic device may further include a metallic coupling member coupled to an end portion of the metal strap, joined to a strap joining portion of the metal housing, and having the non-conductive member disposed on a contact surface, and an electrical connection structure in which the coupling member is grounded to a substrate disposed inside the metal housing.

According to various example embodiments, the electrical connection structure may include a conductive protrusion exposed from the coupling member by penetrating the non-conductive member, a conductive protrusion accommodating portion exposed at an outer surface of the metal housing, and an electrical connecting member electrically connected from a ground of the substrate to the protrusion accommodating portion.

According to various example embodiments, the protrusion accommodating portion may include a recess electrically disconnected or insulated from the metal housing, and the conductive protrusion may be exposed to the protrusion accommodating portion and may be in contact with a conductive port connected to the electrical connecting member.

According to various example embodiments, the conductive protrusion may be be mounted on the recess when the coupling member is joined to the metal housing.

According to various example embodiments, the electrical connecting member may be disposed inside the metal housing, and may include a session cable having a surface covered with a non-conductive material and which is connected from a ground of the substrate to the protrusion accommodating portion.

According to various example embodiments, the conductive protrusion may be formed integrally with the coupling member.

According to various example embodiments, the non-conductive member may be coupled to an end portion of the metal strap, and may include a coupling member which is formed of or comprises a non-conductive material and which is joined to the strap joining portion of the metal housing.

According to various example embodiments, the coupling member may be formed of or comprise synthetic resin (PC).

According to various example embodiments, the metal housing may include a main body portion used as an antenna radiator, and a strap joining portion disposed to at least one region of the main body portion to be joined to the metal strap. The non-conductive member may be disposed between the main body portion and the strap joining portion.

According to various example embodiments, the non-conductive member may be formed with the main body portion and the strap joining portion using, for example, and without limitation, at least one of an insert-molding process, an insert-injection process, and a double-injection process.

According to various example embodiments, a wearable electronic device may include a metal housing used as an antenna radiator by being electrically connected to a communication circuit, and comprising at least one strap joining portion, at least one metal strap including a coupling member joined to the strap joining portion, a non-conductive member disposed on a contact surface of the conductive coupling member which is in contact with the strap joining portion, a conductive protrusion disposed to be exposed to one portion of the non-conductive member and extending from the conductive coupling member, a port insulated from the metal housing while being exposed to a position of the metal housing corresponding to the conductive protrusion, and an electrical connecting member for electrically connecting the port and a ground of a substrate disposed inside the metal housing. The metal strap may be electrically insulated from the metal housing by means of the non-conductive member, and may be grounded to the substrate through the conductive protrusion and the port.

Various example embodiments of the present disclosure are merely examples presented for clarity and are not intended to limit the scope of the present disclosure. Therefore, in addition to the embodiments disclosed herein, various changes in form and detail may be made without departing from the technical concept of the present disclosure will be understood as being included in the scope of the present disclosure.

What is claimed is:

1. A wearable electronic device comprising: a metal housing configured to be used as an antenna radiator and being electrically connected to a communication circuit inside the metal housing, and comprising at least one strap joining portion; at least one metal strap comprising a coupling member joined to the at least one strap joining portion; a non-conductive member comprising a non-conductive material disposed on a contact surface of the coupling member which is in contact with the at least one strap joining portion; a conductive protrusion disposed to be exposed through the non-conductive member and extending from the coupling member; a port insulated from the metal housing and exposed to a position of the metal housing corresponding to the conductive protrusion of the coupling member; and an electrical connecting member configured to electrically connect the port and a ground of a substrate disposed inside the metal housing, wherein the metal strap is electrically insulated from the metal housing by the non-conductive member and is grounded to the substrate through the conductive protrusion and the port.

* * * * *